United States Patent [19]

Arechavaleta et al.

[11] Patent Number: 4,853,823

[45] Date of Patent: Aug. 1, 1989

[54] SAFETY RECEPTACLE

[75] Inventors: Joe R. Arechavaleta, Gilbert; William D. Berg, Glendale, both of Ariz.; Frank P. Dola, Hudson, Fla.

[73] Assignee: AMP Incorporated, Harrisburg, Pa.

[21] Appl. No.: 170,590

[22] Filed: Mar. 21, 1988

Related U.S. Application Data

[63] Continuation of Ser. No. 922,500, Oct. 23, 1986, abandoned.

[51] Int. Cl.[4] .......... H02H 11/00

[52] U.S. Cl. .......... 361/100; 361/1; 361/58; 200/51.09

[58] Field of Search .......... 361/45, 46, 49, 50, 361/58, 88, 100, 93, 101, 1; 200/51.09, 51 R; 307/326

[56] References Cited

U.S. PATENT DOCUMENTS

| | | | |
|---|---|---|---|
| 3,238,492 | 3/1966 | Houston | 339/40 |
| 3,596,079 | 7/1971 | Koester | 200/51.09 |
| 3,617,662 | 11/1971 | Miller | 200/51.09 |
| 3,699,285 | 10/1972 | Bingham et al. | 200/51.09 |
| 3,755,635 | 8/1973 | McGill | 200/51.09 |
| 3,846,598 | 11/1974 | Mucsi | 200/51.09 |
| 4,148,536 | 4/1979 | Petropoulsos et al. | 339/42 |
| 4,156,885 | 5/1979 | Baker et al. | 361/100 |
| 4,168,104 | 9/1979 | Buschow | 339/40 |
| 4,271,337 | 6/1981 | Barkas | 200/51.09 |
| 4,346,419 | 8/1982 | Janniello | 361/100 X |
| 4,389,551 | 6/1983 | Deibele et al. | 200/51 R |
| 4,603,932 | 8/1986 | Heverly | 339/39 |
| 4,605,817 | 8/1986 | Lopez | 174/67 |
| 4,618,200 | 10/1986 | Roberts et al. | 339/75 D |
| 4,618,740 | 10/1986 | Ray et al. | 174/67 |

*Primary Examiner*—Todd E. Deboer

*Attorney, Agent, or Firm*—Eric J. Groen

[57] ABSTRACT

An electrical receptacle is disclosed which deactivates the front of an electrical receptacle when an electrical plug is not present. The receptacle includes a semiconductor switch mounted between the hot contacts of the receptacle, and the hot conductor of an electrical power cable. The receptacle also includes a momentary contact switch located between the contacts of the ground receptacle portion, activated by the ground pin of an electrical plug upon engagement, and deactivated upon retraction of the electrical plug. The momentary contact switch, when activated, also activates the semiconductor switch which in turn, activates the receptacle front. A second embodiment of the invention further includes an optoelectronic switch in series between the momentary contact switch and the semiconductor switch which requires redundant activation of both switches for activation of the receptacle front, remotely activating the optoelectronic switch and local activation of the momentary contact switch by the electric plug.

16 Claims, 4 Drawing Sheets

SAFETY RECEPTACLE

This application is a continuation of application Ser. No. 922,500, filed Oct. 23, 1986, now abandoned.

BACKGROUND OF THE INVENTION

1. Field of the Invention

The instant invention relates to an electrical receptacle for use with alternating current circuitry having a 115 V and 15 or 20 amp rating. The receptacles include a gating feature within the receptacle which deadens the front of the receptacle when no load is present. A second embodiment of the instant invention includes a remote control feature which, when activated by a direct current, in combination with the load across the front of the receptacle, activates the front of the receptacle.

2. Description of the Prior Art

The presence of an electrical receptacle with a potential across the terminals in electrical receptacles has, for some time, presented a hazard to users of the circuit, when the front of the receptacle, whether known or unbeknownst to them, was in fact activated. When the user knows of the hazard, the potential for shock or injury is still possible when, for example, the user is installing or removing a plug while inadvertently contacting the energized prong on the plug while the prongs are in contact with the terminals of the receptacle. The hazard worsens when small children, who may be playing around the electrical receptacles, inadvertently contact the front of the receptacle with their fingers, or with a conductive object with which they are playing.

One solution to this problem has been approached from a mechanical rather than from an electrical design criteria. This approach to designing a "dummy" plug having a dielectric face member with plastic prongs extending from the face for insertion into the receptacle. This approach will prevent injury to those who do not know of the activated front of the receptacle, by "mechanically" preventing their fingers or conductive objects from entering the front of the receptacle. This will not however prevent injury to those who know of the presence of the potential across the terminal and simply and inadvertently contact the prongs of the plug while attempting to install or remove the plug, as the dummy plug must be removed for installation of an electrical plug.

A second approach which has been taken is to totally enclose the receptacle with a cover or box which replaces the face plate on the receptacle and screws into the receptacle front, for example see generally U.S. Pat. Nos. 4,605,817 and 4,603,932. Once again, this may preclude a hazard to one near the receptacle front who does not know of the hazard, but when the cover is removed for accessing the receptacle, the hazard of the activated front is again present.

Another approach has been to install a movable guard within the interior of the plug which is moved out of the way upon installation of the electrical plug. For example see U.S. Pat. No. 4,168,104, which includes a cover with slots offset from the slots which lead to the receptacle. Insertion of the plug causes the ground terminal to move the slots into alignment for reception of the plug. See also U.S. Pat. No. 3,238,492 which includes a set of plates which cooperatively prevent access to the openings into the receptacle. See also U.S. Pat. No. 4,389,551 which has a guard shield which is movable by a pin when the pin is inserted. These types of receptacle still present a hazard to one installing an electrical plug into the receptacle while in contact with the plug pins.

Still another approach is to include an open circuit between the receptacle portion and the binding post portion, completion of the circuit being made by a conductive member which bridges between the receptacle and binding post portions. See for example U.S. Pat. Nos. 3,699,285; 3,846,598; 4,148,536; and 4,271,337. A disadvantage to this approach is that unless an anti-arcing devise is includable, which complicates the system, the internal arcing upon completion of the circuits will burn up the contact surfaces very rapidly.

Another approach has been to include a snap acting switch or point contact means which makes and breaks the electrical circuit path, for example see U.S. Pat. Nos. 3,596,019 and 3,617,662. Each of these references includes point contacting type interconnects which carries the full load of the power. This requires that the switch contacts are heavy gauge material to carry the full current in the line, typically 15 or 20 amperes. This complicates and adds to the expense of the system.

SUMMARY OF THE INVENTION

The thrust of the instant invention is to approach the problem from an electronics design standpoint and remove the hazard of the activated voltage potential from the front of the receptacle when the receptacle has no load across the terminals. Thus, the approach has been taken to design away the activated front receptacle by means of electrical design rather than by means of mechanical design.

In the preferred embodiment of the instant invention an electrical receptacle, which is for use in alternating current circuitry and which is interconnectable with a matable electrical plug, includes first and second receptacle means which have means for contacting respective first and second pins of a matable electrical plug. The first and second receptacle means further comprise means for electrically connecting respective conductors of an electrical cable thereto. The receptacle also includes a third receptacle means and a third means for electrically connecting a third conductor thereto, the receptacle portion and the interconnection portion being electrically isolated. Finally, the receptacle includes switching means for electrically connecting and disconnecting the receptacle portion from the third electrical connecting means.

BRIEF DESCRIPTION OF THE DRAWINGS

FIG. 3 is an electrical circuit diagram for the embodiment shown in FIG. 2.

FIG. 3A is a view similar to that of FIG. 3, showing the TRIAC switch as two parallel inverse SCRs.

DETAILED DESCRIPTION OF THE PREFERRED EMBODIMENT

Figure 1:
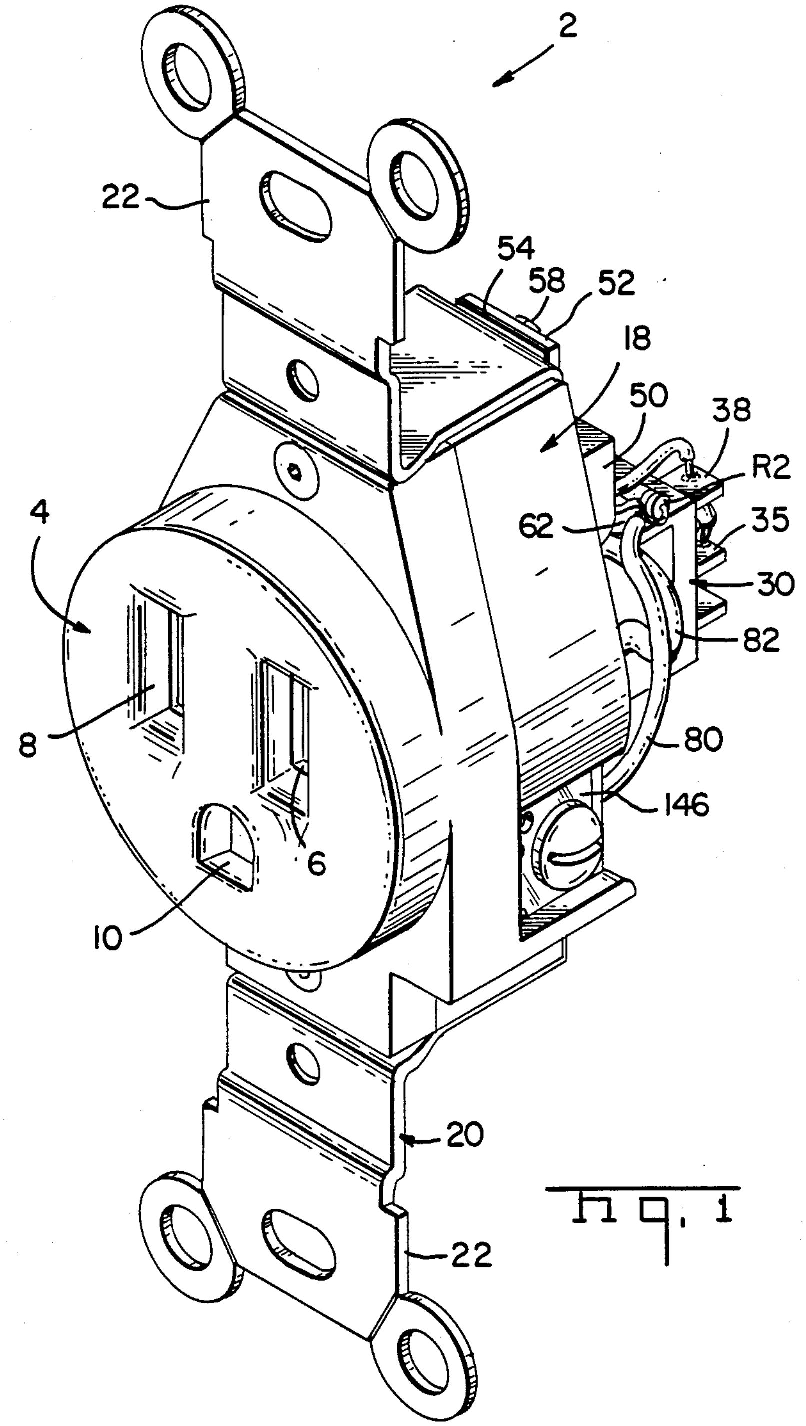
FIG. 1 is a perspective view of the receptacle of the present invention.

FIG. 1 shows a perspective view of the receptacle of the present invention as having an insulative cover plate 4 and an insulative housing 18. The cover plate 4 has standard entries for the contacts of a typical electrical plug, that is, openings 8 for a neutral contact of a plug, opening 6 for the hot contact of a plug, and opening 10 for the ground contact of a plug. The insulative housing member 18 is formed, as is consistent with electrical practice, so as to isolate the hot, neutral and ground terminals from each other. The insulative housing member 18 is molded from a dielectric material and has accepting cavities for receiving each of the terminals and isolating one from the other. The face plate 4 is also molded from a dielectric material and polarizes respective terminals of a plug with respective receptacle contacts.

Figure 2:
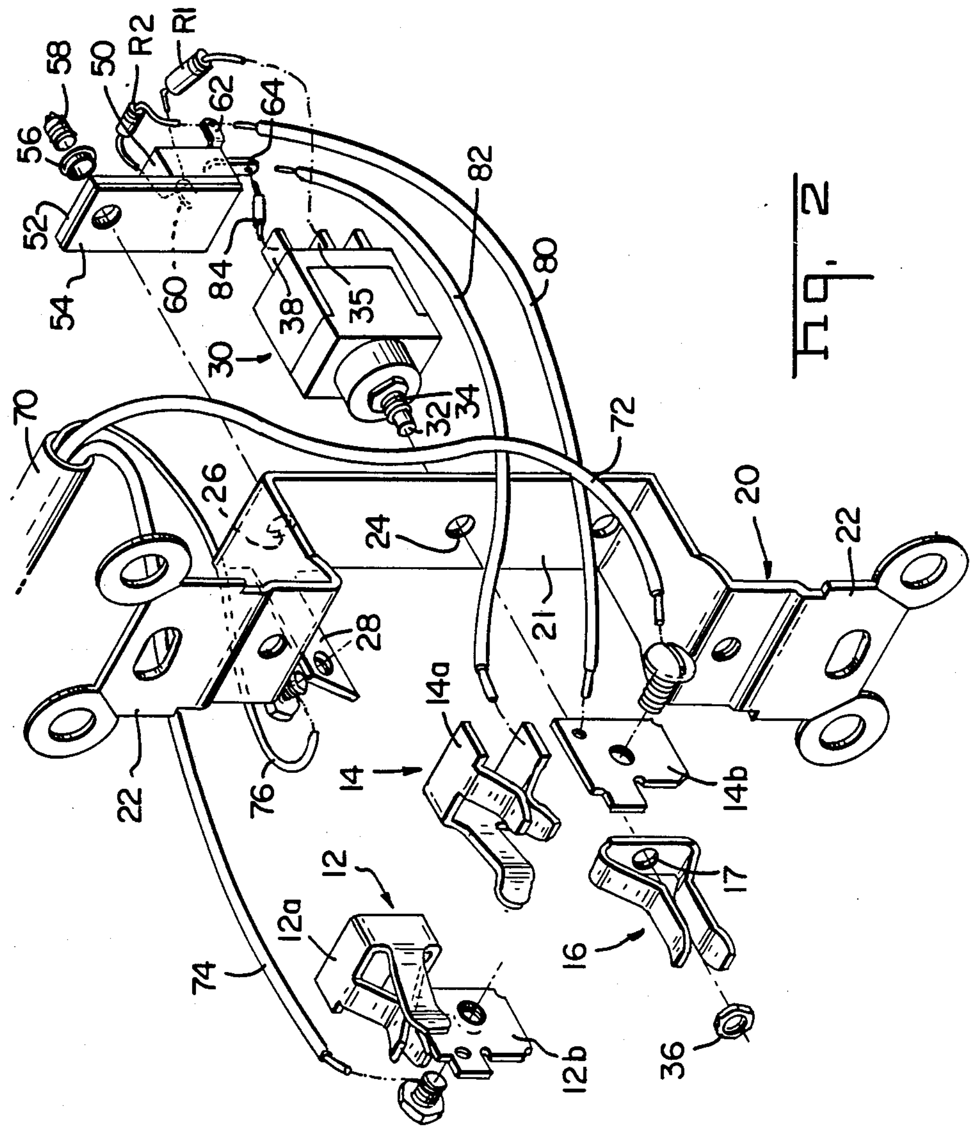
FIG. 2 is a perspective view of the receptacle of the present invention with the electrical components exploded away from the receptacle.
Figure 7A:
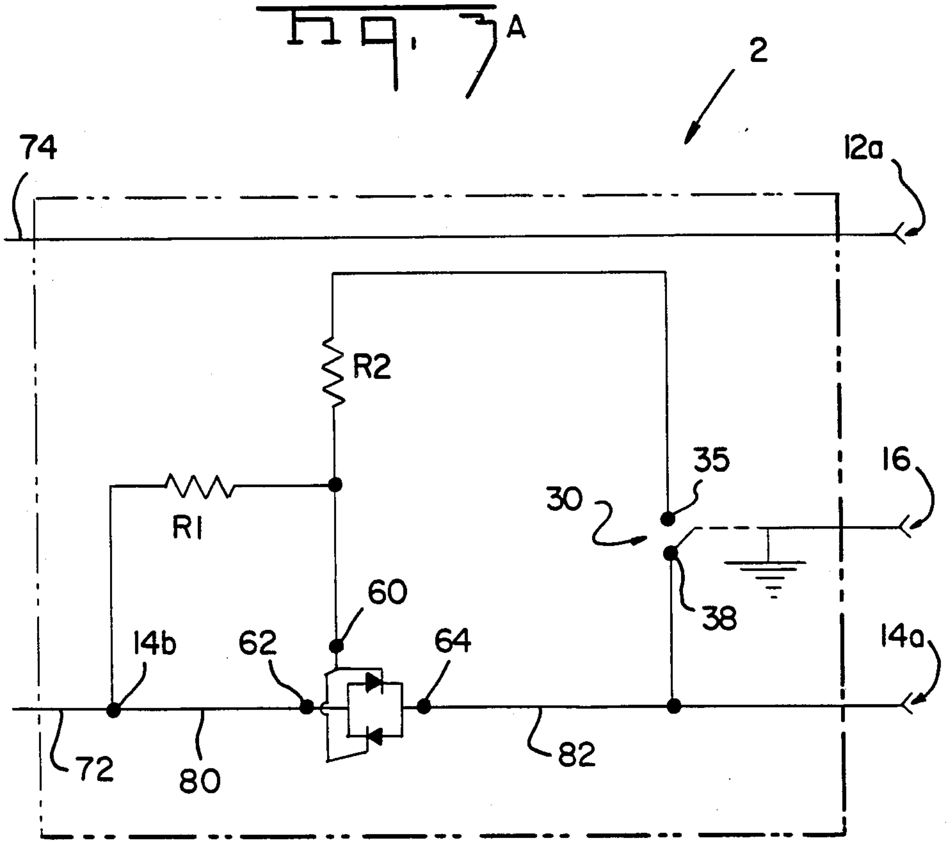

FIG. 2 is a perspective view of the receptacle 2 less the insulative cover plate 4 and insulative housing 18, showing the various electrical components exploded away from the assembly for better clarification of their electrical interconnection. The first embodiment includes mounting strap 20 having standard mounting yokes 22 configured for installation in conventional electrical junction boxes. A neutral receptacle 12, a hot receptacle 14, and a ground receptacle 16 are all shown exploded away from mounting strap 20. The hot receptacle 14 includes a receptacle portion 14*a* for receiving a plug contact, and an interconnect portion 14*b* for receiving the hot wire 72 of a power cable 70. It should be understood that the receptacle portion 14*a* and the interconnect portion 14*b* are not electrically interconnected as is typical in present power receptacles, but rather, reside in distinct cavities within the insulative housing 18 and separated by a dielectric web. The separation of the interconnect 14*b* and the receptacle portion 14*a* is required for the switching mechanism of the hot power which will be described subsequently.

The neutral receptacle 12 includes a receptacle portion 12*a* and an interconnect portion 12*b* for terminating a neutral conductor 74 thereto. The neutral receptacle portion 12*a* and the neutral interconnect portion 12*b* are stamped and formed from a common sheet of metallic material to electrically interconnect the portions 12*a* and 12*b*, as the neutral line within the electrical system is not switched. A grounding terminal 16 is also installed such that the terminal 16 is commoned to the metallic mounting strap 20. It should be understood that neither the neutral receptacle 12 nor the hot receptacle portions 14*a* and 14*b* are commoned to the mounting strap 20. Rather, the insulative cover member 18 isolates the hot and neutral receptacles from each other, from the ground receptacle 16, and from the mounting strap 20.

Still referring to FIG. 2, a momentary contact switch 30 having normally open contacts is insertable through an aperture 24 in the mounting bracket 20 such that the switch 32 extends through the flat plate portion 21 of the mounting strap 20, and through the aperture 17 in the ground receptacle 16 such that the switch 32 is disposed within the ground receptacle portion 16. The grounding receptacle 16 is insertable over the threaded portion 34 of the switch 30 and is connectable by means such as a nut 36, electrically connecting the ground receptacle 16 to the grounding strap 20 and also mechanically fixing the switch 30 to the groundings trap 20. It should also be noticed that the contact switch 32 is now disposed between the two contact members of the ground receptacle 16.

The contact switch 30 includes a central common position 35 and a switched contact 38. The center position 35 receives the voltage to be switched, and shunts it through the switched contact member 38 upon activation. The switch 30 of the preferred embodiment is a momentary contact switch which is activated by pushing the switch portion 32 inward, and remains activated only while the switch portion 32 is depressed.

The receptacle of FIG. 2 further comprises a TRIAC solid state switch located on the mounting plate 52 and insulated from the grounding plate by an insulative film 54. ("TRIAC" is a Trademark of the General Electric Company for a gate controlled semiconductor switch designed for a.c. power control). An insulative sleeve 56 is placed in the aperture of the mounting plate and a threaded screw 58 can be placed through the insulative sleeve 56 to mechanically mount the TRIAC switch 50 and plate 52 to the back side of the mounting bracket 20, while electrically isolating the plate 52 from the mounting bracket 20.

The TRIAC switch 50 includes a gate contact 60, a first contact 62 and a second contact 64. The hot interconnect portion 14*b* is interconnected to the first contact 62 of the TRIAC by means of an insulated wire 80, while the second contact 64 of the TRIAC 50 is interconnected to the receptacle portion 14*a* by means of an insulated wire 82. Gate 60 and first contact 62 of the TRIAC 50 are interconnected by means of a resistor R2, while the central contact 35 of the switch 30 and the gate contact 60 of the TRIAC 50 are interconnected by means of a resistor R1. The switched contact 38 of the momentary contact switch 30 and the second contact 64 of the TRIAC 50 are interconnected by means of an insulated wire 84. The individual conductors of a power cable 70 can then be interconnected to the respective terminals: hot conductor 72 interconnected by a binding screw to the interconnect portion 14*b*; the neutral wire 74 interconnected to the neutral interconnect portion 12*b* by means of a binding screw; and ground conductor 76 interconnected to the mounting strap by means of a binding screw at 28. Assuming now that the receptacle is wired to the power cable as previously described, the operation of the receptacle will be explained with reference to FIG. 3, the dotted lines in FIG. 3 representing the physical enclosure of the receptacle 2.

A TRIAC switch 50 is, in effect, two inverse parallel connected silicon controlled rectifiers (SCR) with a common gate terminal, in this case 60. When the first terminal of the TRIAC 62 and the gate terminal 60 are made positive with respect to the second terminal 64, the first terminal acts as an anode while the second terminal acts as a cathode, and vise versa, when the second terminal 64 and the gate 60 are each made positive with respect to the first terminal 62, the second terminal acts as the anode and the first terminal acts as the cathode. Thus the TRIAC can be used to conduct in either direction, and is therefore compatible for use with a.c. circuitry.

As the electrical contacts between points 35 and 38 of switch 30 are normally open when the momentary contact switch 32 is not depressed, the only current available at the receptacle front, that is across receptacle portions 12*a* and 14*a*, is a small current which leaks through the TRIAC contacts 62 and 64, which is approximately 12 microamps. When no load is applied across terminals 12a and 14a, there is a voltage potential of 115 V between the first contact 62 of the TRIAC and the neutral receptacle 12; a voltage potential of 115 V between the gate contact 60 of the TRIAC and the neutral receptacle 12; and a potential of 115 V between central contact 35 of the switch 30 and the neutral receptacle 12; as the hot wire 72 is connected directly to the TRIAC first contact 62 and thereafter connected to the gate 60 via R1, and then to the switch central common contact 35 through R2. However, this voltage potential is internal to the receptacle, the voltage potential across the front of the receptacle, that is, across terminals 12a and 14a, is limited to a few volts, as a result of the leakage current.

When a load is interconnected to the receptacle front across terminals 12a and 14a, the ground pin of the electrical plug mechanically depresses the contact 32 of switch 30 electrically interconnecting switch contacts 35 and 38. This completes the a.c. circuit, which momentarily causes the first contact 62 and th gate contact 60 to have a positive potential of 115 V with respect to the second TRIAC contact 64. This potential switches the TRIAC 50 on, allowing a current to flow through the TRIAC through points 62 and 64. Thus the circuit between the receptacle interconnect 14b and the receptacle front 14a is thereafter completed, via the TRIAC switch contacts 62 and 64. It should be understood that the switch 30 need not be sized for the full current rating as the switch is only momentarily in the circuit path, which substantially reduces the size of the switch components required.

In the preferred embodiment of the invention, R1 is sized as a large resistor, approximately 1 kilohm. This prevents noise generated from an electrical tool such as a drill or the like, in other parts of the circuitry from inadvertently triggering the TRIAC gate 60 on. R2, on the other hand, is preferably sized small, approximately 62 ohms, in order to ensure that the TRIAC gate is sufficiently energized when the a.c. circuit is completed, to ensure that the gate 60 is triggered on regardless of the load placed on the receptacle front. Thus, the first embodiment shown in FIG. 3 requires that all three pins of a mating electrical plug be inserted into the receptacle front to create a potential difference between the neutral receptacle 12 and the hot receptacle 14a.

This prevents inadvertent shock, for example to children who may insert conductive objects into the hot receptacle (ground fault) causing serious injury or electrocution. The only possible chance of activating the receptacle front is by placing a load across the front of the receptacle, such as a conductive object across the terminals (12a or 16) and 14a, while simultaneously inserting a second object into the ground hole 10 in the face plate 4 to activate the momentary contact switch. In the unlikely event this occurrence takes place it should be remembered that the momentary contact switch must be continuously depressed for continuing activation of the receptacle front.

Furthermore, the instant invention prevents electrical shock to someone who inadvertently is contacting the terminals of the plug while engaging or disengaging the plug from the electrical receptacle front. The length of linear travel of the switch contact 32 during engagement is so short that the plug must be almost fully inserted prior to engagement of the switch 30, therefore physically leaving little space between the electrical plug and between the face plate 4 to contact the plug terminals. Similarly, upon disengagement, the plug must only be retracted a short distance to disengage the switch, again leaving no physical space between the plug and face plate 4 to contact the terminals of the plug.

It should also be noted that the instant invention also prevents the sparking between the electrical terminals of a receptacle and between the contacts of a plug, when a plug is removed from an electrical receptacle. As a three prong plug is removed from the front of a receptacle designed in accordance with the instant invention, the ground pin disengages the momentary contact switch prior to the plug contacts disengaging from the receptacle contacts 12a, 14a. Thus, the TRIAC is deactivated which removes the large potential difference between the hot receptacle 14a and the neutral receptacle portion 12 at the receptacle front. Thus when the plug prongs are removed from the receptacle contacts 12a and 14a, the potential is so small that a sparking cannot occur.

Figure 4:
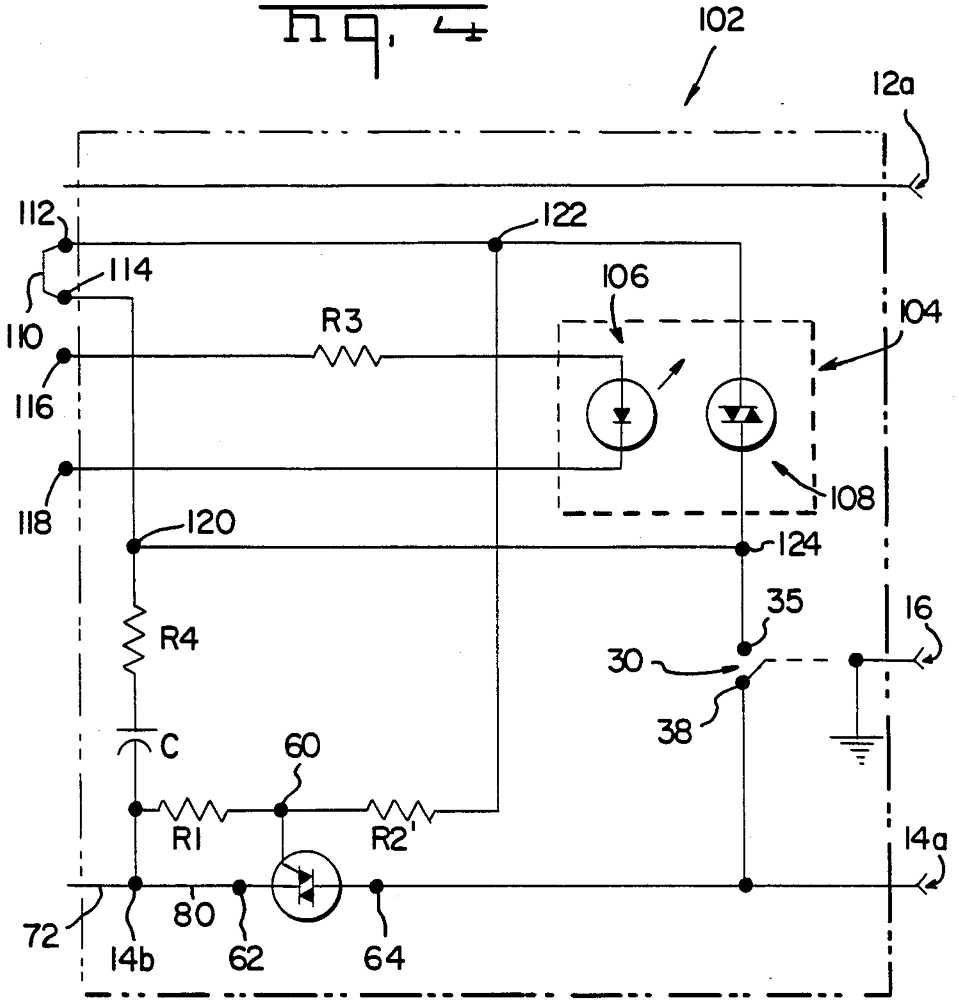
FIG. 4 is an electrical circuit diagram of a second embodiment of the present invention which is remotely controllable.

Referring now to FIG. 4, a second embodiment of the present invention is shown which is optional for use with local or remote energizing of the receptacle front. A second switch 104 is added in series between the momentary contact switch 30 and the load resistor R2'. In the preferred embodiment of the invention the second switch 104 is an opto-isolated TRIAC. If the receptacle front is to be energized locally, the jumper 110 is installed, whereas remote controlling of the receptacle front requires removal of the jumper member 110. The jumper portion 110 could simply be a knockout portion included at the rear of the receptacle 102.

If the receptacle front is to be energized locally, that is if the grounding pin of the mating plug alone is to energize the receptacle, the jumper member 110 is left in. This simply removes the opto-isolated TRIAC 104 from the electrical path to the TRIAC gate 60, as an electrical path is formed between points 124 to 120 through the jumper 110 to point 122 and through resistor R2' to the gate 60 of the TRIAC 50. Thus with the jumper member 110 in place, when the mating plug is inserted into the receptacle front, closing the momentary contact switch 30, an a.c. circuit is completed, and allows the gate 60 to be triggered through the switch 30 through points 124, 120, through the jumper 110, through point 122, and through the load resistor R2' thereby switching the gate 60 of the TRIAC 50 on allowing a current path thereafter through points 62, 64 of the TRIAC.

When it is desired to remotely control the energizing of the receptacle front, the jumper member 110 is removed thereby creating an open circuit between points 120 and 122, which places the opto-isolated TRIAC 104 in series with the switch 30 and the TRIAC 50. The opto-isolated TRIAC 104 comprises a light emitting diode (LED) 106 and a TRIAC 108 combined in a single package, which is typically in the form of a dual-in-line package (DIP). The opto-isolated TRIAC 104 is controlled remotely by a direct current (d.c.) signal voltage across points 116 and 118. When the LED is activated, the TRIAC 108 is switched on, although switching the TRIAC 108 on, in and of itself, does not complete an a.c. circuit, and thus does not energize the receptacle front. It is not until the prongs of the matable electrical plug are installed into the receptacle, putting a load across the terminals 12a and 14a and depressing the contact 32 of the switch 30, that the a.c. circuit is completed. This also allows for the completion of the circuit between the switch 30, the TRIAC 108, point 122, and the load resistor R2′ allowing for the triggering of the gate 60 of the TRIAC 50. Once again, the triggering of the gate 60 closes the switch between points 62 and 64 of the TRIAC 50 allowing a completed circuit between points **14*b* and 14*a*. In the remote controlled mode, either removal of the plug from the receptacle front or turning the LED 106 off will deenergize the receptacle front thereby removing the potential across the receptacle contacts 12*a* and 14*a***.

The preferred embodiment of the circuit shown in FIG. 4 also includes a capacitor C and a resistor R4 between the receptacle **14*b* and point 120. This RC combination provides for a snubber circuit which assists in shutting off the TRIAC switch upon deenergizing of the opto-isolated TRIAC 104**. In the preferred embodiment of the instant invention the capacitor C is sized at 0.1 microfarads while the resistor R4 is sized at 100 ohms.

It should be understood that the present invention is explained by specific reference to the preferred embodiments for illustrative purposes only and should not be taken to limit the scope of the claims which follow. More specifically, it should be understood that a switch other than a momentary contact switch could be utilized to detect the presence of the plug contacts. It should also be understood that the momentary contact switch could be locatable in any of the receptacle openings and detected by any of the plug contacts. Furthermore, solid state switching means other than the opto-isolated TRIAC 104 and the TRIAC could be incorporated into the system for switching purposes.

What is claimed is:

1. An electrical circuit, comprising:

an electrical receptacle having a hot, neutral and ground conductor receiving portion for receiving respective conductors of a power cable and hot, neutral and ground contact portion for contacting respective mating terminals of an electrical plug;

a first switching means, comprising a semiconductor switch, controllable by a gate means, serially disposed between the hot conductor receiving portion and the hot contact portion of the electrical receptacle, the first switching means allowing a current path therethrough when in the switched position; and a second switching means for activating the first switching means into a switched position which electrically interconnects the hot conductor receiving portion with the hot contact, and for deactivating the first switching means from the switched position; and a third switching means in series between the gate means and the second switching means.

2. An electrical circuit as claimed in claim 1 wherein the third switching means comprises an optoelectronic coupler.

3. An electrical circuit as claimed in claim 1 wherein the second switching means comprises a momentary contact switch.

4. An electrical circuit as claimed in claim 3 wherein the momentary contact switch is locatable adjacent to the ground contact portion to detect the presence of the grounding pin.

5. An electrical circuit as claimed in claim 4 wherein the momentary contact switch has a switch portion which energizes the switch which is locatable within the ground contact portion of the receptacle which is capable of detecting the presence of the grounding pin, whereby when the electrical plug is mated with the electrical receptacle, the momentary contact switch energizes the gate of the semiconductor switch allowing alternating current flow between the hot contact portion and the hot connection within the receptacle.

6. An electrical receptacle for use in alternating current circuitry, interconnectable with a matable three pin electrical plug, comprising:

first receptacle means having first pin receiving contact means electrically interconnected to first conductor connecting means;

second receptacle means having second pin receiving contact means and second conductor connecting means, the second pin receiving contact means being electrically isolated from the second conductor connecting means;

third receptacle means having third pin receiving contact means and third conductor connecting means electrically interconnected to the third pin receiving contact means;

switching means, comprising a semiconductor switch serially located between the second contact means and the second conductor connecting means and controlled by a gate means for electrically connecting and disconnecting said second contact means and said second conductor connecting means, allowing a switched condition through the switching means, between the second connecting means and the second contact means; and means, located adjacent to one of said receptacle means, for detecting the presence of the matable electrical plug, the detecting means being electrically connected in series between said second pin receiving contact means and said gate means and controlling the switched condition of the switching means thereby effecting said electrical interconnection between the second pin receiving contact means and the second conductor connecting means.

7. An electrical receptacle as claimed in claim 6 wherein the detecting means comprises a momentary contact switch.

8. An electrical receptacle as claimed in claim 7 wherein an actuator on the momentary contact switch is located within the contacting means of one of the receptacle portions.

9. An electrical receptacle as claimed in claim 8 wherein the momentary contact switch is located within the contacting portion of a ground receptacle means.

10. An electrical receptacle as claimed in claim 6 wherein the switching means comprises at least one silicon controlled rectifier.

11. An electrical receptacle as claimed in claim 10 wherein the switching means comprises two inverse parallel connected silicon controlled rectifiers with a common gate.

12. An electrical receptacle as claimed in claim 11 wherein activation of the gate activates the rectifiers for conduction in either direction.

13. An electrical receptacle as claimed in claim 12 wherein the switching means comprises a TRIAC switch.

14. An electrical receptacle as claimed in claim 6 wherein the reception of a matable electrical plug causes an electronic charge at the gate means which activates the semiconductor switch, thereby completing the interconnection between the contacting means and the connecting means.

15. An electrical receptacle as claimed in claim 6 further comprising a second switching means in series with said first switch and said semiconductor switch for redundantly controlling the activation of said electrical interconnection.

16. An electrical receptacle as claimed in claim 15 wherein the second switching means comprises an opto-electronic coupler.

* * * * *